June 7, 1932.  H. G. BERSIE  1,861,736

MEANS FOR EVAPORATING FUMIGANTS

Filed April 17, 1931

Patented June 7, 1932

1,861,736

UNITED STATES PATENT OFFICE

HUGH G. BERSIE, OF WILMETTE, ILLINOIS, ASSIGNOR TO HASKELITE MANUFACTURING CORPORATION, A CORPORATION OF NEW YORK

MEANS FOR EVAPORATING FUMIGANTS

Application filed April 17, 1931. Serial No. 530,813.

It is common practice to destroy insects in fur, garments and other articles, or fabrics that are attacked by insects, by placing them in a closed room or chamber and evaporating therein a fumigant. Where the task is to be carried out in a short time, the fumigant must be one having a low boiling point, so that the evaporation thereof will be effected quickly. For fumigation on a considerable scale, it is, therefore, usual to supply the fumigant in containers, in liquid form and under heavy pressure, suitable valved piping serving to distribute the fumigant through the fumigating chamber. These fumigants of low boiling point absorb heat from the surrounding atmosphere, in evaporating, and, therefore, cause a drop in temperature within the fumigating chamber. Destruction of insect life through fumigation is best accomplished in a warm atmosphere whereas, at low temperatures, fumigation is harmless to the insects. Therefore, the cooling action of the fumigant often neutralizes the power of the fumigant to destroy and is, therefore, objectionable. Another disadvantage of the cooling action of the fumigant is that the piping is cooled below the dew point of the atmosphere in the fumigating chamber, causing condensation of moisture and dripping thereof upon the goods that are being treated. These objections may possibly be overcome by evaporating the fumigant so slowly that the harmful results to which I have referred will not follow but, in that case, the advantage of using a highly volatile fumigant will be lost.

The principal object of the present invention is to make it possible rapidly to distribute through a fumigating chamber a fumigant of low boiling point, without lowering the temperature of the atmosphere in the chamber below that at which insects will readily be destroyed or below the dew point of such atmosphere.

Figure 1:
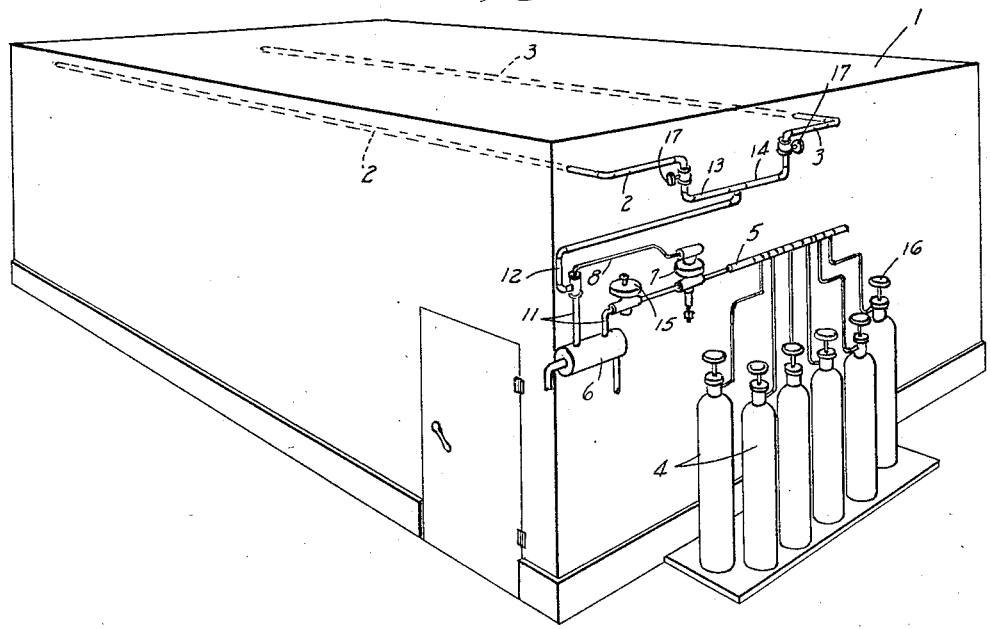
Figure 2:
Figure 2:
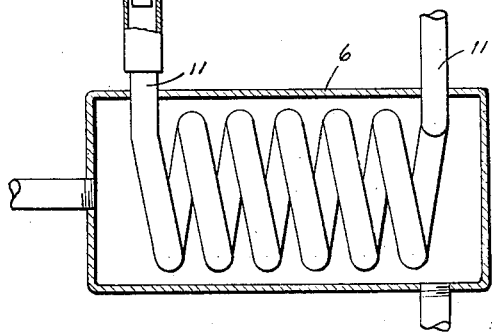

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a perspective view of a fumigating chamber equipped in accordance with my invention; and Fig. 2 is a sectional view, on a larger scale, of a fragment of the apparatus, showing the heater and the thermostat for controlling the flow of fumigant.

Referring to the drawing, 1 represents a closed room or chamber into the top of which lead two pipes 2 and 3 adapted to distribute a fumigant through the chamber. The fumigant is usually supplied in liquid form, stored in cylinders 4 under heavy pressure. As many of these cylinders as desired may be connected to a manifold, indicated at 5. From the manifold the fumigant may flow under its own pressure to the pipes 2 and 3, or to either of them. In accordance with my invention, there is interposed between the manifold and the distributing pipes a heater 6 of any usual or suitable construction. Consequently, the fluids, when they reach the distributing pipes, will not be cold but will have been warmed so that no moisture will condense on the distributing pipes and the temperature in the chamber will remain high enough to insure satisfactory results from the fumigating process. The temperature will depend on the size of the heater and the rate of flow of the fumigant.

It may well happen that, if the heater is large enough to warm the fluids being discharged from two or three cylinders, it will not be adequate if half a dozen cylinders are turned on at one time. I have, therefore, provided a reducing valve 7 between the manifold and the heater to control the flow of fumigant and prevent it from reaching the distributing pipes in too cool a state, regardless of the number of cylinders that are open to the manifold. The reducing valve illustrated is of a well known type controlled by the pressure with a sealed conduit 8. An enlarged part 9 at one end of the conduit lies which extends a delivering pipe 12 which the supply pipe 11 from the heater and from which extends a delivering pipe 12 which branches, as indicated at 13 and 14, and joins the two distributing pipes. When the fumigant begins to flow, the heater being in operation, it is warmed by the heater and in turn warms the valve-controlling medium in the enlarged part 9 of the conduit 8. If the temperature of the fumigant leaving the heater is too low, the valve 7 will begin to close, restricting the flow until the heater is able to raise the temperature to the required point. If the temperature should be higher than necessary, the valve will open farther and permit an increased flow. In this way the fumigant will be distributed in the shortest time consistent with maintenance of the proper temperature of the fumigant.

The reducing valve 7 is responsive only to the temperature of the fumigant entering the distributing pipes and, therefore, the pressure may become greater than is desirable. Therefore, in order to insure against too high a pressure in the distributing pipes, I provide a second reducing valve 15, conveniently placed between the valve 7 and the heater, this second valve being responsive to the pressure in the system. As long as the pressure is low enough, the flow may be controlled solely by the thermostatic reducing valve; but, when the pressure tends to rise above a predetermined point, the valve 15 comes into play and restricts the flow of fumigant sufficiently to keep the pressure down.

Of course, there is a valve on each cylinder, as indicated at 16 and, in each of the branch pipes 13 and 14, is a valve, indicated at 17. This arrangement permits any one or more cylinders to be cut in and permits either or both distributing pipes to be shut off.

I prefer to employ automatic reducing valve means to control the flow of fumigant after the hand valves have been opened, as this eliminates the need of constant attention on the part of the operator to insure proper temperature and pressure conditions; but it is evident that the regulation of the temperature and, to a lesser extent, the regulation of the pressure, are the important features, regardless of the manner in which they are brought about.

My invention is not limited to the use of any particular fumigant, as it may be employed with any fumigant whose boiling point is low enough to bring about the objectionable conditions which it is my purpose to eliminate. However, it may be noted that a mixture of carbon dioxide and ethylene oxide, ethylene dichloride, carbon tetrachloride or chloropicrin, for example, can be handled to advantage in my improved system.

Such a low degree of temperature is produced by the evaporation of the fumigants just named, or at least some of them, that not only will the temperature of the atmosphere in the fumigating chamber be lowered below the dew point, when these fumigants are distributed in the usual way, but frost will form on the distributing pipes. By my invention the creation of frost is, of course, prevented. It is possible that the reducing valves may become very cold and tend to collect frost and, therefore, I have placed them close to the heater so that they will absorb more or less heat therefrom. The valve 15, at least, will be warmed by conduction of heat along the pipe 11, and both valves will be warmed somewhat by radiated heat and by the surrounding atmosphere which gathers heat from the heater.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In an apparatus of the character described, a conduit adapted to discharge into an enclosed space a fluid which in liquid form has a boiling point below the dew point of the atmosphere in said space, a receptacle for such a liquid, a connection between the receptacle and the conduit permitting the receptacle to discharge into the conduit, and means to heat the conduit sufficiently to maintain the temperature of the gas delivered into and also the temperature of that part of the conduit within said space above the dew point of the said atmosphere.

2. The combination with a chamber to be fumigated and a conduit extending into the same to distribute therein a fluid fumigant, of a receptacle for a liquid fumigant whose boiling point is below the dew point of the atmosphere in the chamber, a connection between the receptacle and the conduit, and means for heating a portion of the conduit outside of said chamber sufficiently to cause the temperature of that part of the conduit within the chamber and of the fumigant discharged thereby to be maintained above the dew point of said atmosphere.

3. The combination with a chamber to be fumigated and a conduit extending into the same to distribute therein a fluid fumigant, of a receptacle for a liquid fumigant whose boiling point is below the dew point of the atmosphere in the chamber and which liquid is under great pressure, a connection between the receptacle and the conduit, a pressure reducing valve in said connection, and means for heating said conduit in the vicinity of said valve to prevent freezing of the valve and maintain the temperature of the conduit and of the gas discharged thereby above the dew point of the atmosphere in the chamber.

4. The combination with a chamber to be fumigated and a conduit extending into the same to distribute therein a fluid fumigant, of a receptacle for a liquid fumigant whose boiling point is below the dew point of the atmosphere in the chamber and which liquid is under great pressure, a connection between the receptacle and the conduit, a pressure reducing valve in said connection, means for heating said conduit in the vicinity of said valve to prevent freezing of the valve and maintain the temperature of the conduit and of the gas discharged thereby above the dew point of the atmosphere in the chamber, and means controlled by the temperature of the fluid flowing through said conduit for controlling the reducing valve.

5. The combination with a chamber to be fumigated and a conduit extending into the same to distribute therein a fluid fumigant, of a receptacle for a liquid fumigant whose boiling point is below the dew point of the atmosphere in the chamber and which liquid is under great pressure, a connection between said conduit and said receptacle, two pressure regulating valves in said connection, a heater for the conduit, and means controlled by the temperature of the fluid flowing through said conduit to control one of said valves.

6. The combination with a chamber to be fumigated and a conduit extending into the same to distribute therein a fluid fumigant, of a receptacle for a liquid fumigant whose boiling point is below the dew point of the atmosphere in the chamber and which liquid is under great pressure, a connection between the receptacle and the conduit, a pressure reducing valve in said connection, and means for heating said conduit to maintain the temperature of the conduit and of the gas discharged thereby above the dew point of the atmosphere in the chamber.

7. The combination with a chamber to be fumigated and a conduit extending into the same to distribute therein a fluid fumigant, of a receptacle for a liquid fumigant whose boiling point is below the dew point of the atmosphere in the chamber and which liquid is under great pressure, a connection between the receptacle and the conduit, a pressure reducing valve in said connection, means for heating said conduit to maintain the temperature of the conduit and of the gas discharged thereby above the dew point of the atmosphere in the chamber, and means controlled by the temperature of the fluid flowing through said conduit for controlling the reducing valve.

In testimony whereof I sign this specification.

HUGH G. BERSIE.